(No Model.)

C. S. PLATT.
INSTRUMENT FOR REMOVING MEAT FROM HARD SHELL CRABS.

No. 577,172. Patented Feb. 16, 1897.

Witnesses:
O. W. Gardner.
Michael J. O'Connor.

Inventor:
Charles S. Platt,
By his Attorney
George William Miatt

UNITED STATES PATENT OFFICE.

CHARLES S. PLATT, OF NEW YORK, N. Y.

INSTRUMENT FOR REMOVING MEAT FROM HARD-SHELL CRABS.

SPECIFICATION forming part of Letters Patent No. 577,172, dated February 16, 1897.

Application filed January 30, 1896. Serial No. 577,438. (No model.)

*To all whom it may concern:*

Be it known that I, CHARLES S. PLATT, a citizen of the United States, residing in the city, county, and State of New York, have invented a certain new and useful Instrument for Removing the Meat from Hard-Shell Crabs, of which the following is a specification sufficient to enable others skilled in the art to which the invention appertains to make and use the same.

My invention is designed to afford an implement for detaching and extracting the edible parts of crabs and lobsters from their natural covering of shell.

The invention consists, essentially, in a scraper coming to a point, the pick of which scraper shall be concaved, the point enabling the implement to be pushed into the chambers or cells of the crab or lobster shell in which the meat or edible portion is contained, the scraper detaching the meat from its covering of shell and the concavity receiving and holding the substance detached, so that it shall be brought out with the implement when the same is withdrawn.

Figure 1:
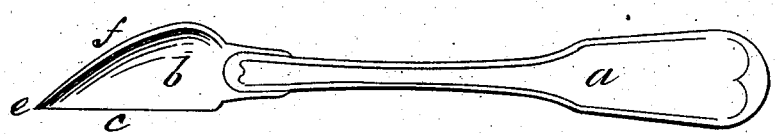
Figure 2:
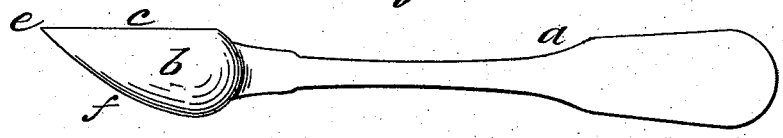
Figure 3:
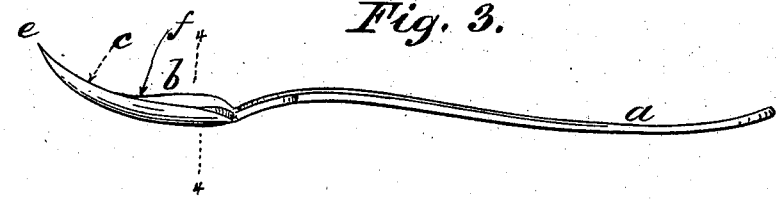
Figure 4:

In the accompanying drawings, Figure 1 is a plan of my improved implement; Fig. 2, a view of the under side thereof; Fig. 3, a side elevation; Fig. 4, a transverse section of the same on plane of line 4 4, Fig. 3.

The implement consists of the usual handle $a$, which may be of any suitable shape or design, my invention having no reference to that part of the implement, and the concaved pick $b$, terminating in a sharp point $e$, having one of its edges $c$ (the scraper) parallel with the longitudinal axis of the handle $a$. When the scraper $c$ is thus formed, the other edge $f$ of the pick $b$ may be formed in any manner so that it meets the scraper $c$ at an acute angle, forming the point $e$.

My invention is especially devised and adapted for use as a crab or lobster pick and for detaching and withdrawing the meat from the cells or compartments of shell in which the same is contained, a large portion of which meat is now wasted and destroyed by reason of the inutility of the known methods of extracting the same.

What I claim as my invention, and desire to secure by Letters Patent, is—

As an article of manufacture, an instrument of the kind described, comprising a handle, a concaved body or bowl, terminating in a sharp point, having one side straight and parallel with the axis of the handle, and formed into a scraping edge, as and for the purpose specified.

CHAS. S. PLATT.

Witnesses:
 WALTER LARGE,
 LOUIS N. ROWLEY.